(12) United States Patent
Senda

(10) Patent No.: US 10,677,291 B2
(45) Date of Patent: Jun. 9, 2020

(54) SEALING DEVICE

(71) Applicant: NOK CORPORATION, Tokyo (JP)

(72) Inventor: Mari Senda, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 15/725,667

(22) Filed: Oct. 5, 2017

(65) Prior Publication Data
US 2018/0135700 A1    May 17, 2018

(51) Int. Cl.
*F16C 33/80* (2006.01)
*F16J 15/3232* (2016.01)
*F16J 15/3264* (2016.01)
*F16C 33/78* (2006.01)

(52) U.S. Cl.
CPC ........ *F16C 33/805* (2013.01); *F16C 33/7883* (2013.01); *F16J 15/3232* (2013.01); *F16J 15/3264* (2013.01); *F16C 2326/02* (2013.01)

(58) Field of Classification Search
CPC .... F16J 15/3232; F16J 15/3256; F16J 15/326; F16J 15/3264; F16C 33/805; B60B 27/0073
See application file for complete search history.

(56) References Cited

U.S. PATENT DOCUMENTS

| | | | |
|---|---|---|---|
| 6,471,211 B1 * | 10/2002 | Garnett | F16C 19/34 277/351 |
| 8,753,017 B2 * | 6/2014 | Shibata | F16C 33/7823 384/486 |
| 9,074,689 B2 * | 7/2015 | Duch | F16J 15/3232 |
| 9,358,833 B2 * | 6/2016 | Gulli | F16J 15/3264 |
| 9,534,636 B2 * | 1/2017 | Takayama | F16C 33/7823 |
| 9,956,820 B2 * | 5/2018 | Gulli | B60B 27/0073 |

(Continued)

FOREIGN PATENT DOCUMENTS

| | | | |
|---|---|---|---|
| JP | 2007-285499 A | 11/2007 | |
| JP | 2007285374 A | * 11/2007 | ......... F16C 33/7883 |

(Continued)

OTHER PUBLICATIONS

Canadian Office Action dated Aug. 24, 2018 (corresponding to CA 2979110).

(Continued)

*Primary Examiner* — Nicholas L Foster
(74) *Attorney, Agent, or Firm* — Daniel J. Sepanik, Esq.; Harness, Dickey & Pierce, P.L.C.

(57) ABSTRACT

A sealing device including a sealing device main body 1 mounted on one of two members 101 that rotate relatively, and a seal flange mounted to the other of the two members 102. The sealing device main body 1 is provided with a structure provided with a seal lip 12 slidably connected to a seal flange 22, and a tube part 18 positioned further to the outer side than the seal lip 12. A labyrinth lip 15 is provided on the sealing device main body 1 positioned further to the outer side than the seal lip 12; and, the labyrinth lip 15 extends towards the radially opposite side to the tip end of the seal flange 22 facing the tube part 18 in a radial direction, as the tip end closely faces the seal flange 22 in an axial direction, and a labyrinth gap 3 is formed between the labyrinth lip 15 and the seal flange 22, and the tube part 18.

1 Claim, 3 Drawing Sheets

(56) References Cited

U.S. PATENT DOCUMENTS

| | | | |
|---|---|---|---|
| 2009/0058011 A1* | 3/2009 | Shibayama | B60B 27/0005 277/361 |
| 2013/0243359 A1* | 9/2013 | Shibata | F16C 33/7823 384/486 |
| 2014/0374996 A1* | 12/2014 | Duch | F16J 15/3232 277/562 |
| 2015/0098670 A1* | 4/2015 | Gulli | F16J 15/3264 384/486 |
| 2015/0117805 A1* | 4/2015 | Takayama | F16C 33/7823 384/446 |
| 2016/0003302 A1* | 1/2016 | Seno | F16J 15/3264 277/351 |
| 2016/0236509 A1* | 8/2016 | Gull | B60B 27/0073 |
| 2018/0258995 A1* | 9/2018 | Mitsuishi | F16C 33/80 |
| 2019/0024717 A1* | 1/2019 | Sato | F16C 33/7823 |

FOREIGN PATENT DOCUMENTS

| | | |
|---|---|---|
| JP | 2013-044419 A | 3/2013 |
| JP | 2013-249927 A | 12/2013 |

OTHER PUBLICATIONS

Canadian Office Action dated Mar. 11, 2019 (corresponding to CA 2979110).
Canadian Office Action dated Sep. 18, 2019 (corresponding to CA 2979110).

* cited by examiner

SEALING DEVICE

CROSS-REFERENCE TO RELATED APPLICATIONS

This application claims the benefit and priority of Japanese Application No. 2016-198667, filed Oct. 7, 2016. The entire disclosure of the above application is incorporated herein by reference.

FIELD

The present disclosure relates to a sealing device, used in automobiles, general machinery, industrial machinery, or the like, and provided with a structure wherein a seal lip mounted on one of two members that rotate relatively is slidably connected with a seal flange mounted to the other of the two members.

BACKGROUND

An object provided with a structure wherein a seal lip of a stationary side is slidably connected to a seal flange on a rotation side is used as a sealing device for preventing muddy water or the like infiltrating from an external part to a hub bearing of an automobile.

FIG. 3 illustrates a conventional example of this type of sealing device; in other words, it is provided with a sealing device main body 110 mounted on the inner circumference of an outer ring 101, which is a stationary side on a hub bearing 100 of an automobile, and a slinger 120, composed of a sleeve 121, fitted on the outer circumference of an inner ring 102, which is a rotation side on the hub bearing 100, and a seal flange 122, extending from one end thereof; wherein, a side lip 111 provided on the sealing device main body 110 slidably connected to the seal flange 122 of the slinger 120, is slidably connected on the seal flange 122 of the slinger 120, and a radial lip 112 provided on the sealing device main body 110, positioned on the inner circumference side of the side lip 111 is slidably connected to the outer circumference surface of the sleeve 121 of the slinger 120.

Furthermore, a pulsar ring 123, formed in a disc-shape with a rubbery elastic body mixed with a magnetic powder, wherein different circumferentially alternating magnetic poles are magnetized, is adhered integrally on the outer side surface of the flange 122 of the slinger 120, and a magnetic rotary encoder is configured by a magnetic sensor (not illustrated) being disposed on an outer side of the pulsar ring 123, facing the outer side surface thereof in the axial direction.

That is, a sealing device of this type prevents infiltration of muddy water or the like from an outer part A to a bearing inner part B, by the shaking action of the seal flange 122 which rotates integrally with the inner ring 102, in a slide part of the seal flange 122 of the slinger 120 and the side lip 111 of the sealing device main body 110. Furthermore, even if muddy water or the like slightly infiltrates an enclosed space C of the inner circumference side thereof from a connected slide part of the seal flange 122 and the side lip 111, these are sealed by the connected slide part of the sleeve 121 of the slinger 120 and the radial lip 112, and is returned to the outer circumference side of the side lip 111 by the shaking action of the seal flange 122.

Moreover, a sealing device of this type is provided with a labyrinth seal 130, which is a non-contact type seal wherein an outer diameter tubular part 113 and an outer diameter end of the seal flange 122 of the slinger 120 in the sealing device main body 110 are facing in a radial direction, on the outer side of the side lip 111, with the object of improving muddy water resistance by making it less likely for muddy water or the like from the outer part A to cover the side lip 111, even in harsh environments (for example, please see the following prior art documents).

PRIOR ART DOCUMENTS

Patent Documents

Patent Document 1 Japanese Unexamined Patent Application No. 2013-044419
Patent Document 2 Japanese Unexamined Patent Application No. 2013-249927
Patent Document 3 Japanese Unexamined Patent Application No. 2007-285499

SUMMARY

Problem to be Solved by the Disclosure

However, as described in the prior art documents, although the labyrinth seal 130 provided on the outer side of the side lip 111 has an advantage wherein friction torque or sliding heat generation such as with a contact type seal does not occur, sealability is slightly inferior in comparison to contact types since generally the gap between the outer diameter end of the seal flange 122 and the outer diameter tubular part 113 of the sealing device main body 110 barely narrows; in this respect there is room for improvement.

In light of the foregoing points with respect to the technical issue, the present disclosure improves muddy water resistance in a sealing device with a structure wherein the seal lip mounted on one of two members that rotate relatively and a seal flange mounted to the other of the two members are in sliding contact.

Means for Solving the Problem

In order to solve the foregoing technical issue, the sealing device according to the disclosure comprises a sealing device main body mounted on one of two members that rotate relatively and a seal flange mounted to the other of the two members; wherein, the sealing device main body is provided with a structure provided with a seal lip slidably connected to the seal flange and a tube part positioned further to the outer side than the seal lip, and a labyrinth lip is provided on the sealing device main body positioned further to the outer side than the seal lip; and, the labyrinth lip extends towards the radially opposite side to the tip end of the seal flange facing the tube part in a radial direction, as the tip end closely faces the seal flange in an axial direction, and a labyrinth gap is formed between the labyrinth lip and the seal flange, and the tube part.

Furthermore, the sealing device according to the disclosure comprises a configuration, wherein the seal flange inclines further towards the labyrinth lip side on the tip end side than the opposite position of the tip end of the labyrinth lip.

Effect of the Disclosure

According to the sealing device of the present disclosure, the labyrinth lip configures the labyrinth gap for suppressing infiltration of muddy water or the like from an outer part on the outer side than the seal lip; therefore, it is possible to improve water sealability and to maintain the sealability of the seal slip over a long period. In particular, it is possible to obtain a high labyrinth seal effect since the labyrinth lip positioned further to the outer side than the seal lip extends towards the radially opposite side to the tip part end of the seal flange, as the tip end closely faces the seal flange in an axial direction, even if the seal flange does not bend greatly further to the labyrinth lip side on the outer side than the opposite position of the tip end of the labyrinth lip.

DRAWINGS

DETAILED DESCRIPTION

A preferred embodiment for carrying out the sealing device of the present disclosure will be described below with reference to drawings. First, FIG. 1 illustrates the first embodiment.

Figure 1:
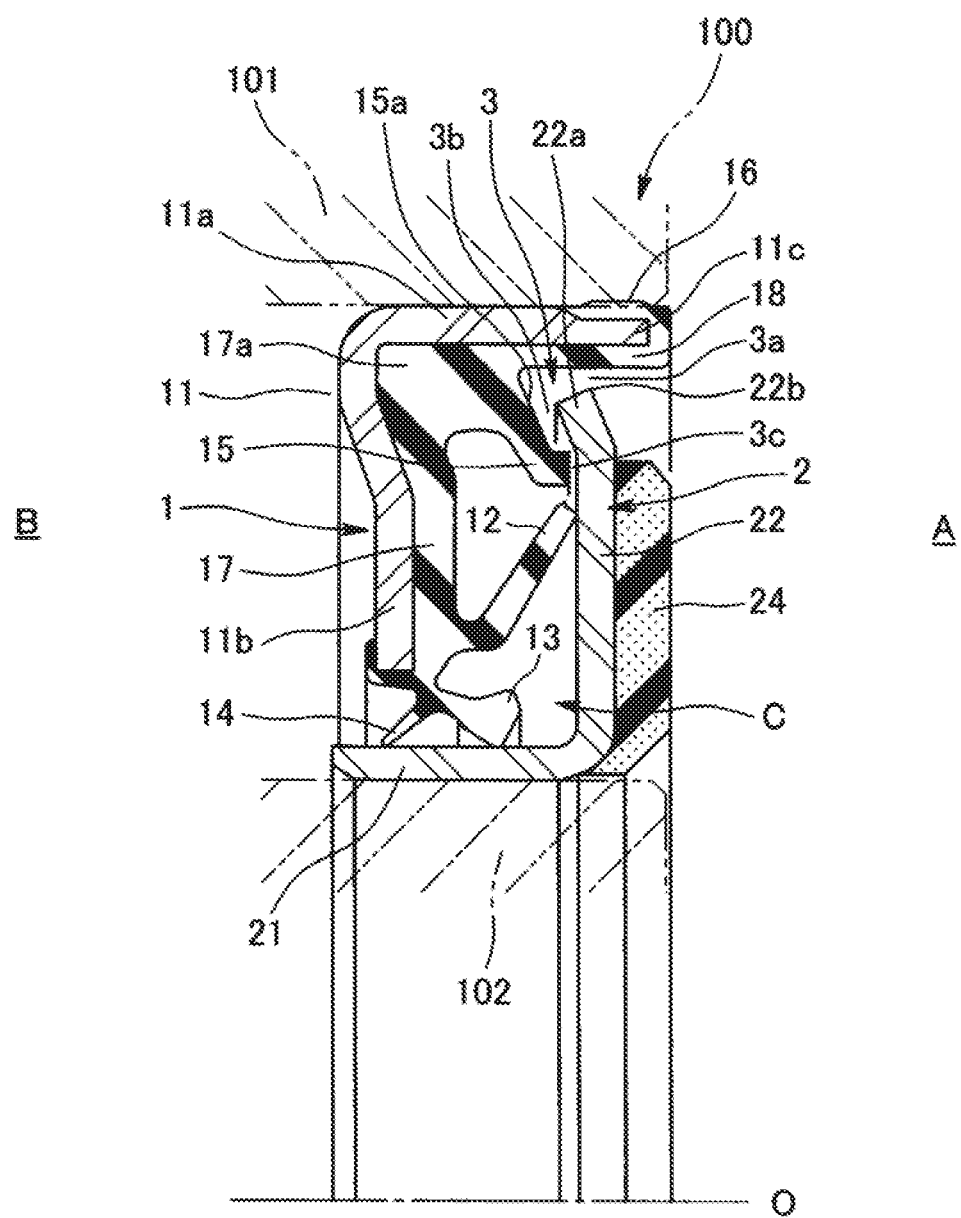
FIG. 1 is a half-sectional view illustrating the first embodiment for carrying out the sealing device according to the present disclosure, cut along a plane passing through axis center 0 thereof.

Reference numeral 100 in FIG. 1 is a hub bearing in an automobile and is composed of a plurality of steel balls disposed slidably between the outer ring 101, fixed to a knuckle which is not illustrated in the automobile, and the inner ring 102, fitted integrally to a hub which is not illustrated on the wheel side, or the hub. Note that the outer ring 101 corresponds to "one of two members that rotate relatively," and the inner ring 102 corresponds to "the other of the two members."

The sealing device of the first embodiment prevents muddy water or the like from the outer part A of the hub bearing 100 infiltrating the bearing inner part B, and also prevents enclosed grease for lubricating the bearing inner part B from flowing to the outer part A; therefore, it is provided with a sealing device main body 1 mounted on the inner circumference surface of the outer ring 101 of the hub bearing 100, and a slinger 2 mounted on the outer circumference surface of the inner ring 102 of the hub bearing 100.

The sealing device main body 1 is provided with a metallic reinforcing ring 11, a side lip 12 composed of a rubber elastic body formed integrally on the reinforcing ring 11, a radial lip 13, a grease lip 14, a labyrinth lip 15, and an outer circumference seal part 16. Note that the side lip 12 and the radial lip 13 correspond to the "seal lip."

The slinger 2 is produced by presswork of a metal plate or the like, and is provided with a sleeve 21 which is press-fitted with an appropriate tightening margin on the outer circumference surface of the inner ring 102 of the hub bearing 100, and a seal flange 22 developed in a disc-shape from the tip part of the outer part A side thereof to the outer diameter side.

The reinforcing ring 11 in the sealing device main body 1 is produced by presswork of a metal plate or the like, and composed of a mating tube part 11a with a cylindrical shape, and an inward facing flange 11b that extends from the tip part of the bearing inner part B side of the mating tube part 11a to the inner diameter side. Of these, the outer diameter is formed with a slightly larger diameter than the inner circumference surface of the outer ring 101, and a thin-walled part 11c wherein its thickness is reduced to the inner circumference side is formed close to the tip end thereof, so that the mating tube part 11a is press-fitted with an appropriate tightening margin on the inner circumference surface of the outer ring 101 of the hub bearing 100.

The side lip 12 in the sealing device main body 1 forms a conical tubular shape that extends so as to form a large diameter towards the opposite side to the hub bearing inner part B, from a base elastic layer 17, formed with a rubber elastic body on the surface facing the opposite side to the hub bearing inner part B in the inward facing flange 11b of the reinforcing ring 11, and the entire circumference of the tip end part is slidably connected to the inner side surface of the seal flange 22 of the slinger 2, while in a state that has undergone an appropriately bent deformation to the axial direction.

The radial lip 13 in the sealing device main body 1 forms a conical tubular shape that extends so as to form a small diameter towards the opposite side to the hub bearing inner part B, from the inner diameter end part of the base elastic layer 17, positioned further to the inner circumference side than the side lip 12, and the entire circumference of the inner diameter part close to the tip end is slidably connected to the outer circumference surface of the sleeve 21 of the slinger 2, while in a state that has undergone an appropriately expanded deformation.

The grease lip 14 in the sealing device main body 1 forms a conical tubular shape that extends so as to form a small diameter towards the hub bearing inner part B side, further to the hub bearing inner part B side than the radial lip 13, and the inner diameter part close to the tip end is slidably connected to the outer circumference surface of the sleeve 21 of the slinger 2.

The labyrinth lip 15 in the sealing device main body 1 is provided on the outer circumference side of the side lip 12, or in other words, positioned further to the outer part A side than the side lip 12, and extends to the radially opposite side to the side lip 12, that is, to the inner diameter side, from an outer diameter part 17a of the base elastic layer 17 which is deposited on the inner circumference surface of the mating tube part 11a in the reinforcing ring 11, and the tip end closely faces the inner side surface of the seal flange 22 of the slinger 2 in the axial direction.

Furthermore, the seal flange 22 of the slinger 2 has an outer diameter side which inclines further to the labyrinth lip 15 side than the opposite position to the tip end of the labyrinth lip 15, and the outer diameter end part thereof extends from the base part of the labyrinth lip 15, and closely faces the inner circumference surface of a tubular elastic layer 18, deposited on the inner circumference surface of the tip end part of the mating tube part 11a in the reinforcing ring 11. On the other hand, an outer side surface 15a of the labyrinth lip 15 forms an approximate parallel incline surface with an inclined outer diameter part 22a of the seal flange 22. Note that the tubular elastic layer 18 corresponds to the "tube part."

The outer circumference seal part 16 in the sealing device main body 1 is formed with a rubber elastic body on the outer circumference surface of the thin-walled part 11c, formed on the tip end part of the mating tube part 11a in the reinforcing ring 11, and connected by an appropriate thinning margin to the inner circumference surface of the outer ring 101 of the hub bearing 100.

A pulsar ring 24 is adhered integrally on the outer side surface of the seal flange 22 of the slinger 2. The pulsar ring 24 is formed in a disc-shape with a material with a fine powder of magnetic material added to a rubbery elastic body or a synthetic resin material, the S pole and N pole are alternately magnetized (multipolar magnetization) at a predetermined pitch in the circumferential direction, and a magnetic rotary encoder is configured by a magnetic sensor that is not illustrated that is disposed on the axial direction outer side thereof. That is, as for the rotary encoder, when the pulsar ring 24 that is integrated with the slinger 2 rotates together with the inner ring 102 of the hub bearing 100, the N pole and S pole magnetized by the pulsar ring 24 pass through the face surface of the magnetic sensor alternately in the rotation direction; therefore, a wave signal corresponding to a change in the magnetic field due to this is output from the magnetic sensor, and it becomes possible to measure rotations by counting pulses.

A sealing device configured as in the foregoing prevents infiltration of muddy water or the like coming in from the outer part A by the shaking action of the seal flange 22 which rotates as the side lip 12 of the sealing device main body 1, which does not rotate and is fitted to the outer ring 101 of the hub bearing 100, connectively slides with the seal flange 22 of the slinger 2, which rotates integrally with the inner ring 102 of the hub bearing 100. Furthermore, even if muddy water or the like slightly infiltrates the enclosed space C of the inner circumference side thereof from the connected slide part of the seal flange 22 and the side lip 12, these are sealed by the radial lip 13 which connectively slides with the sleeve 21 of the slinger 2; therefore, muddy water or the like cannot easily infiltrate the bearing inner part B, and ultimately is returned to the outer circumference side (outer part A) of the side lip 12 by the shaking action of the seal flange 22.

Here, since a labyrinth gap 3 is formed between the tubular elastic layer 18 of the sealing body device 1, the labyrinth lip 15 and the seal flange 22 of the slinger 2 on the outer side (outer circumference side) by a slide seal part through the side lip 12 of the sealing device main body 1 and the seal flange 22 of the slinger 2, it is possible to effectively suppress muddy water or the like coming from the outer part A from infiltrating to the slide part of the side lip 12.

That is, muddy water or the like that is about to infiltrate the slide part of the side lip 12 from the outer part A must go through the labyrinth gap 3, and the gap 3 has a part 3a narrowed between an outer diameter edge 22b on the opposite side to the incline direction in the inclined outer diameter part 22a of the seal flange 22 and the tubular elastic layer 18; a part 3b extending diagonally to the inner diameter side between the inclined outer diameter part 22a of the seal flange 22 and the outer side surface 15a of the labyrinth lip 15 via a part that is gradually broadened in the inner side thereof; and a part 3c narrowed between the inner side surface of the seal flange 22 and the tip end of the labyrinth lip 15 facing this in the axial direction in the inner diameter side thereof.

That is, the labyrinth gap 3 forms a complicated shape that is sharply bent to a diagonal inner diameter direction from the axial direction, and moreover, the breadth of the gap 3 forms $3a > 3b > 3c$; therefore, it is possible to cause a large pressure loss to the muddy water or the like that is about to pass through the labyrinth gap 3 from the outer part A towards the side lip 12 side. As a result, even if the long labyrinth gap is not formed by the outer diameter part of the seal flange 22 bending into a right angle and extending to a cylindrical shape, it becomes difficult for muddy water or the like to infiltrate the slide part side of the side lip 12, and accordingly, it is possible to maintain the sealability of the side lip 12 and the radial lip 13 over a long period. Moreover, since the labyrinth lip 15 is non-contact with respect to the seal flange 22 of the slinger 2, there is no increase in torque or heat generation.

Figure 2:
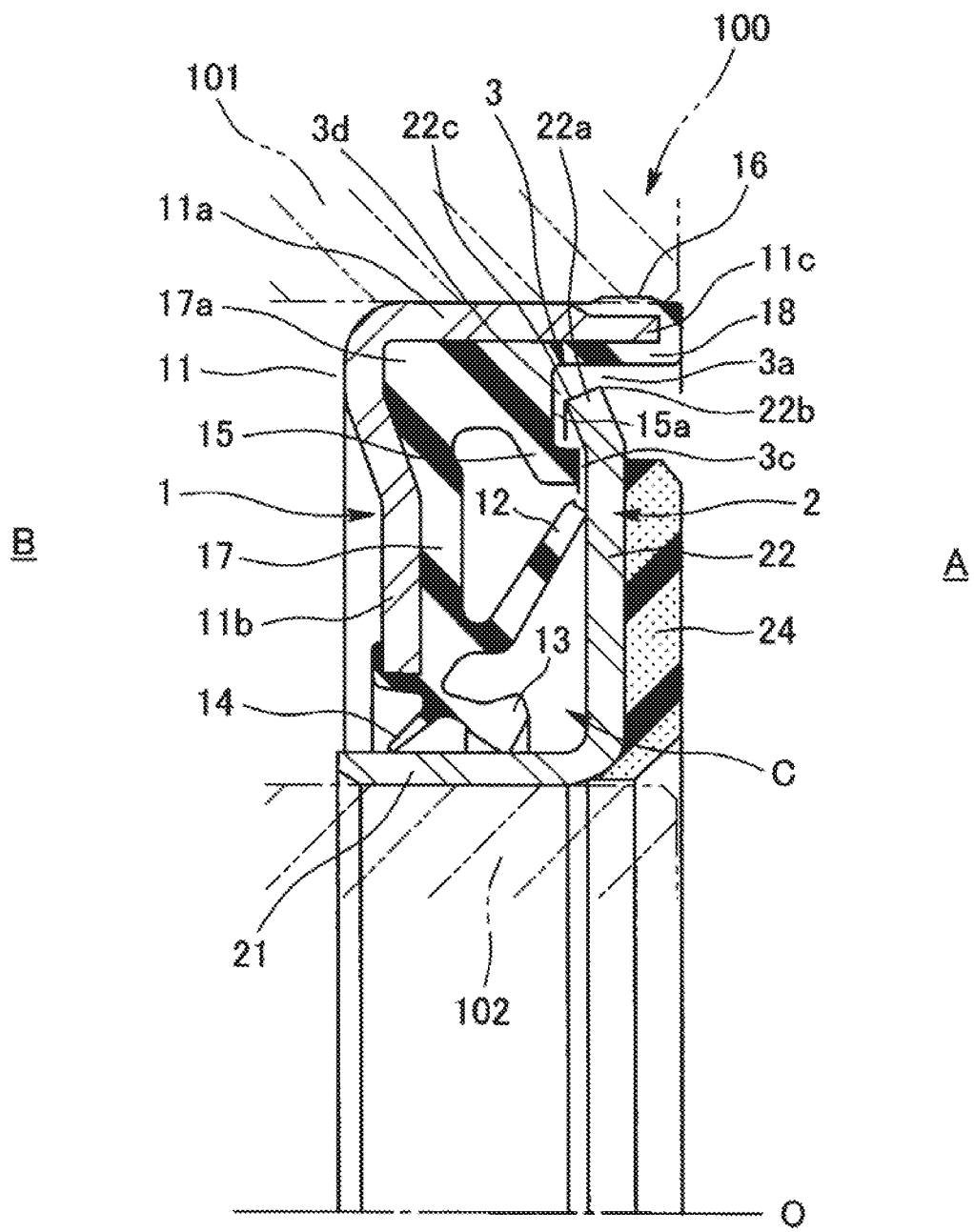
FIG. 2 is a half-sectional view illustrating the second embodiment for carrying out the sealing device according to the present disclosure, cut along a plane passing through axis center 0 thereof.
Figure 3:
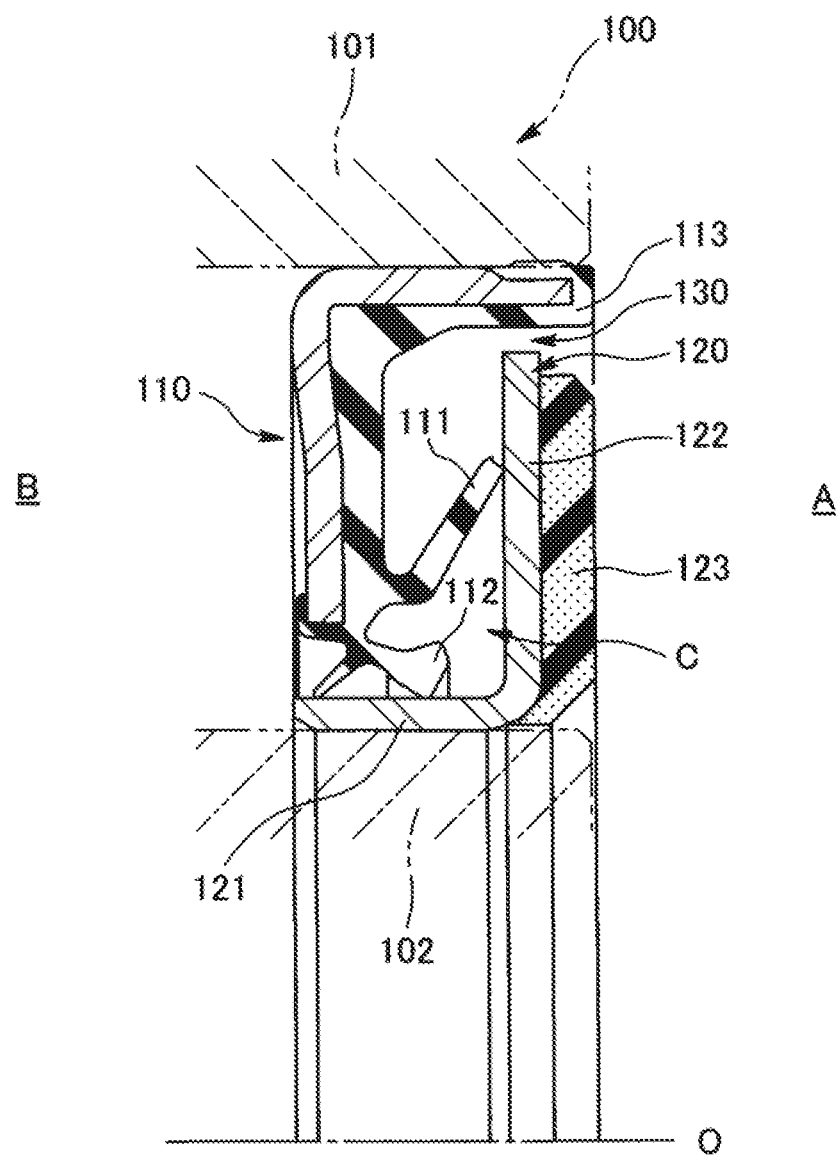
FIG. 3 is a half-sectional view illustrating an example of a conventional sealing device, cut along a plane passing through axis center 0 thereof.

Next, FIG. 2 illustrates the second embodiment for carrying out the sealing device according to the present disclosure. This form is different to the foregoing first embodiment in that the outer side surface 15a of the labyrinth lip 15 in the sealing device 1 forms a plane approximately orthogonal to the axis center O. The other parts are the same as those in the first embodiment.

According to the second embodiment, the labyrinth gap 3 that is formed between the tubular elastic layer 18 of the sealing device main body 1, the labyrinth lip 15, and the seal flange 22 of the slinger 2 has the part 3a narrowed between the outer diameter edge 22b on the opposite side to the incline direction in the inclined outer diameter part 22a of the seal flange 22 and the tubular elastic layer 18 in the sealing device main body 1; a part 3d narrowed between an outer diameter edge 22c of the incline direction side in the inclined outer diameter part 22a of the seal flange 22, and the outer side surface 15a of the labyrinth lip 15 via a part gradually broadened in the inner side thereof; and the part 3c narrowed between the inner side surface of the seal flange 22 and the tip end of the labyrinth lip 15 facing this in the axial direction via a part gradually broadened in the inner diameter side thereof.

That is, the labyrinth gap 3 alternately forms a narrow part and a broad part, and moreover, the narrowed part $3a$, $3d$, $3c$ become narrower the closer they are to the side lip 12; therefore, it is possible to repeatedly cause a large pressure loss to muddy water or the like that is about to pass through the labyrinth gap 3. As a result, even if the long labyrinth gap is not formed by the outer diameter part of the seal flange 22 bending into a right angle and extending to a cylindrical shape, it becomes difficult for muddy water or the like to infiltrate the slide part side of the side lip 12, and accordingly, it is possible to maintain the sealability of the side lip 12 and the radial lip 13 over a long period. Moreover, since the labyrinth lip 15 is non-contact with respect to the seal flange 22 of the slinger 2, there is no increase in torque or heat generation.

Note that the illustrated forms are objects wherein the present disclosure is applied to the sealing device and a magnetic rotary encoder installed therein, and it is possible to similarly implement an object that does not have a magnetic rotary encoder provided.

DESCRIPTION OF REFERENCE NUMERALS

1 Sealing device main body
11 Reinforcing ring
12 Side lip (seal lip)
13 Radial lip (seal lip)
14 Grease lip
15 Labyrinth lip
16 Outer circumference seal part
17 Base elastic layer
18 Tubular elastic layer (tube part)
2 Slinger
22 Seal flange
22a Inclined outer diameter part
3 Labyrinth gap
100 Hub bearing
101 Outer ring (one of two members that rotate relatively)
102 Inner ring (the other of the two members that rotate relatively)
A Outer part
B Bearing inner part

What is claimed is:

1. A sealing device, comprising:

a sealing device main body mounted on one of two members that rotate relatively; and a slinger having a sleeve mounted to an other of the two members and having a seal flange extending radially outward from the sleeve;

wherein the sealing device main body is provided with a structure provided with a seal lip slidably engaged with a first axial face of the seal flange, wherein the first axial face faces the sleeve in a first axial direction, the sealing device main body including a tube part positioned further to an outer side than the seal lip, the sealing device main body including a radial lip and a grease lip each engaging the sleeve of the slinger;

a labyrinth lip is provided on the sealing device main body positioned further to the outer side than the seal lip and extending radially inward from the tube part; and the labyrinth lip extends towards the seal flange at a location inward from the tip end so that the labyrinth lip closely faces the first axial face of the seal flange in an axial direction, and a labyrinth gap is formed between the labyrinth lip and the first axial face of the seal flange and between an outer diameter tip edge of the seal flange and the tube part, wherein the outer diameter tip edge of the seal flange is inclined axially beyond a tip end of the labyrinth lip so that the tip edge of the seal flange axially overlaps the tip end of the labyrinth lip.

* * * * *

UNITED STATES PATENT AND TRADEMARK OFFICE
CERTIFICATE OF CORRECTION

PATENT NO. : 10,677,291 B2
APPLICATION NO. : 15/725667
DATED : June 9, 2020
INVENTOR(S) : Mari Senda Page 1 of 1

It is certified that error appears in the above-identified patent and that said Letters Patent is hereby corrected as shown below:

On the Title Page

Column 1, item (65) Prior Publication Data; Line 1; after "2018", insert --¶(30) Foreign Application Priority Data Oct. 7, 2016 (JP) 2016-198667--

Signed and Sealed this
Twenty-eighth Day of July, 2020

Andrei Iancu
*Director of the United States Patent and Trademark Office*